United States Patent
Fischer et al.

(10) Patent No.: US 7,396,072 B2
(45) Date of Patent: Jul. 8, 2008

(54) SIDE PANEL FOR A MOTOR VEHICLE, AND METHOD OF MAKING SUCH A SIDE PANEL

(75) Inventors: Jochem Fischer, Ostfildern (DE); Sven Druhmann, Bielefeld (DE); Todd Tjoelker, Bad Driburg (DE); Werner Böhmer, Willebadessen (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 101 days.

(21) Appl. No.: 11/258,394

(22) Filed: Oct. 25, 2005

(65) Prior Publication Data
US 2006/0097549 A1 May 11, 2006

(30) Foreign Application Priority Data
Nov. 5, 2004 (DE) .................. 10 2004 053 917

(51) Int. Cl.
B60J 7/00 (2006.01)
(52) U.S. Cl. .................. 296/203.03; 296/187.12; 296/193.05; 296/193.06
(58) Field of Classification Search ............ 296/187.12, 296/193.05, 193.06, 203.03
See application file for complete search history.

(56) References Cited

U.S. PATENT DOCUMENTS

| | | | | |
|---|---|---|---|---|
| 3,703,093 A | | 11/1972 | Komatsu et al. | |
| 5,619,784 A | * | 4/1997 | Nishimoto et al. | 296/193.01 |
| 5,860,694 A | * | 1/1999 | Seefried et al. | 296/203.03 |
| 5,916,389 A | | 6/1999 | Lundström | |
| 5,954,390 A | * | 9/1999 | Kleinhoffer et al. | 296/203.01 |
| 6,322,135 B1 | * | 11/2001 | Okana et al. | 296/203.03 |
| 6,428,085 B1 | * | 8/2002 | Miyasaka et al. | 296/187.12 |
| 2003/0071487 A1 | * | 4/2003 | Dahl et al. | 296/190.08 |

OTHER PUBLICATIONS

"Audi A2 production", tipstrends.online@3sat.de of Jun. 9, 2000, URL:http://www.3sat.de/Tipps/aktuell/7566 and 3sat program "Tips & Trends mobil2000" of Jun. 10, 2002, the.

"Innovationspreis" [*Innovation Prize*], "Wirtschaftswoche" [*Weekly Economy*], Apr. 2001, URL://www.berlinews.de/archiv/1629.shtml.

* cited by examiner

*Primary Examiner*—Lori L Lyjak
(74) *Attorney, Agent, or Firm*—Henry M. Feiereisen

(57) ABSTRACT

A side panel for a motor vehicle includes a bottom sill member, a roof panel portion, and a plurality of pillars extending between the sill member and the roof panel portion. The sill member forms with the pillars and the roof panel portion a single-piece structure from a sheet metal blank made of high-strength steel and has at least one region which is partly hardened and subject to increased load in the event of a crash of the motor vehicle.

14 Claims, 3 Drawing Sheets

SIDE PANEL FOR A MOTOR VEHICLE, AND METHOD OF MAKING SUCH A SIDE PANEL

CROSS-REFERENCES TO RELATED APPLICATIONS

This application claims the priority of German Patent Application, Serial No. 10 2004 053 917.0, filed Nov. 5, 2004, pursuant to 35 U.S.C. 119(a)-(d), the subject matter of which is/are incorporated herein by reference.

BACKGROUND OF THE INVENTION

The present invention relates, in general, to a side panel for a motor vehicle, and to a method of making such a side panel.

A prior art side panel of a door frame of a motor vehicle is shown by a side view in FIG. 1 and generally designated by reference numeral 1. The side panel 1 has an A pillar 2, a B pillar 3, and a sill member 4 which is connected, e.g. welded, in the foot area with the A and B pillars. Reference characters F1 and F2 designate joints between the sill member 4 and the A and B pillars 2, 3. A further joint F3 is provided in an area of the roof panel 5 between the B pillar 3 and the A pillar 2. The individual components of the side panel 1 are typically made by a hot-forming process, whereby the joints F1, F2, F3 are provided by spot welding or gluing. A problem encountered with this type of prior art side panel 1 is the presence of tension peaks in the area of the joints F1, F2, F3. In addition, welding requires material overlap which has an adverse effect on the overall vehicle weight.

Although individual components of a side panel for a motor vehicle are subject to widely different loads and strains, the provision of a continuous transition between different material strengths could not be realized heretofore.

In tipstrends.online@3sat.de of Jun. 9, 2000, URL: http://www.3sat.de/Tipps/aktuell/7566 and 3sat program "Tips & Trends mobil2000" of Jun. 10, 2002, the Audi A2 production is described, using single-piece side panels of aluminum. In the magazine "Wirtschaftswoche" [*Weekly Economy*], April 2001, URL: http://www.berlinews.de/archiv/1629.shtml "Innovationspreis" [*Innovation Prize*], it is noted that the single-piece side panel construction result in a reduced fuel consumption by the Audi A2. The reduction in weight through use of aluminum is however offset by the significantly added costs for aluminum compared with traditional constructional steel.

It would therefore be desirable and advantageous to provide an improved side panel for a motor vehicle to obviate prior art shortcomings and to allow simple manufacture with continuous transition between different material strengths while using inexpensive materials and still reliably coping with situations in which the side panel is subject to loads and strain.

SUMMARY OF THE INVENTION

According to one aspect of the present invention, a side panel for a motor vehicle includes a bottom sill member, a roof panel portion, and a plurality of pillars extending between the sill member and the roof panel portion, wherein the sill member forms with the pillars and the roof panel portion a single-piece structure from a sheet metal blank made of high-strength steel and having at least one region which is hardened and subject to increased load in the event of a crash of the motor vehicle.

The present invention resolves prior art problems by providing a single sheet metal blank that is large enough to allow manufacture of a single-piece construction of sill member, pillars and roof panel. The use of a single sheet metal blank for all afore-stated components of the side panel for a motor vehicle significantly simplifies manufacture because a single pressing operation is sufficient to make the side panel. No joining operation is required and no strength-decreasing joints are present. At the same time, the overall weight of the side panel is reduced due to the absence of material overlaps. The manufacture of a single-piece side panel from a single sheet metal blank also results in a smooth and continuous transition between different material strengths within the structure, whereby those side panel areas that are exposed to greatest stress in the event of a crash can be hardened.

According to another feature of the present invention, the sheet metal blank may be made of a steel alloy containing carbon at an amount between 0.15% by weight to 2.0% by weight. This type of material can be heat treated, i.e. quenched and tempered, in an economic manner and hot formed to satisfy the necessary material strength requirements.

According to another feature of the present invention, the sheet metal blank may be made of a steel alloy containing, in weight percent, 0.18% to 0.3% of carbon (C), 0.1.% to 0.7% of silicon (Si), 1.0% to 2.5% of manganese (Mn), 0.1% to 0.8% of chrome (Cr), 0.1% to 0.5% of molybdenum (Mo), 0.02% to 0.05% of titanium (Ti), 0.002% to 0.05% of boron (B), 0.01% to 0.06% of aluminum (Al), max. 0.01% of sulfur (S), max. 0.025% of phosphor (P), the balance being iron (Fe) and incidental melt-based impurities. This type of steel material is suitably hot formed.

According to another feature of the present invention, the sheet metal blank may be aluminized. In other words, the sheet metal blank can be pre-coated with aluminum. In this way, the sheet metal blank is protected against decarburization during heat treatment while at the same time its corrosion resistance is enhanced. As a consequence, the need for an after-treatment to provide corrosion resistance is normally eliminated. The aluminum coating may contain about 90% of aluminum and 10% of silicon. Both alloys exhibit superior mechanical properties and result in significant weight saving.

According to another aspect of the present invention, a method of making a side panel for a motor vehicle includes the steps of providing a sheet metal blank made of high-strength steel, hardening at least one region of the sheet metal blank, and pressing in a single step the sheet metal blank to form a single-piece structure of sill member and roof panel portion with interconnecting pillars. The sheet metal blank can thus be formed and heat treated in a single operating cycle whereby those regions that are most likely subject to high loads are hardened.

According to another feature of the present invention, the sheet metal blank may have a constant thickness. As an alternative, a sheet metal blank may be used with weight-optimized regions. The sheet metal blank may thus have areas of different thicknesses by roll-forming certain areas. Even the use of, for example, laser-welded blanks of different material thicknesses is conceivable. Relevant is only that the sheet metal blank can be shaped to a semi-finished product of sufficient size before being shaped into the side panel, without requiring any further joining operations, following the shaping process into the side panel, for connecting, for example, the sill member via a pillar to the roof frame portion.

The adaptive heat treatment can be implemented through application of a hot-forming tool with different tempering zones so as to realize and maintain different strength demands of individual regions as well as tolerance demands for the overall structure. Subsequent joining operations are completely eliminated. Manufacture of a structure-reinforced vehicle side panel through a hot-forming process from a sheet metal blank of high-strength material allows the formation of areas of greater thickness with reduced hardness and at the same time formation of areas of smaller thickness but greater hardness. The partially hardened areas, especially in the area of the A and B pillars and optionally the C/D pillar and the sill member area, provide a targeted absorption of crash energy and define the space for occupants of the motor vehicle that is necessary for survival in the event of a crash.

An advantage of the present invention is the possibility to jointly shape the sill member with the pillars and to allow their heat treatment.

According to another feature of the present invention, a seat cross member may be provided for attachment in one piece to the side panel and for simultaneous heat treatment.

According to another feature of the present invention, the sheet metal blank may have a multi-layer construction for use in the area of the A and B pillars as well as the sill member. In this way, additional energy may be absorbed in especially critical zones.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
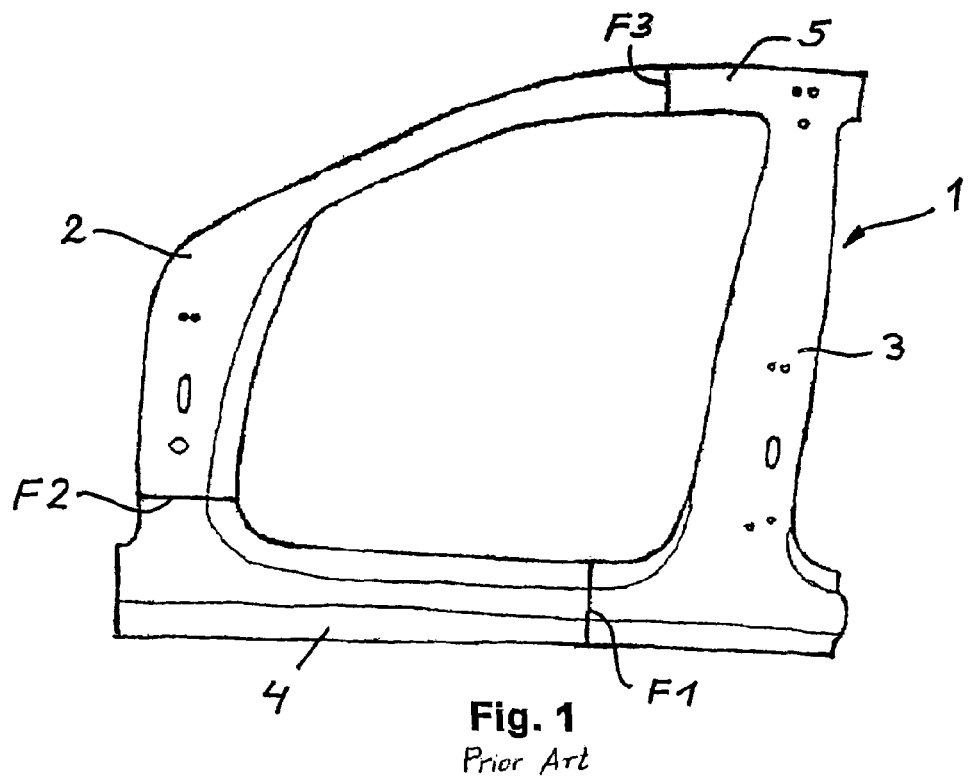
FIG. 1 is a side view of the door frame region of a prior art side panel for a motor vehicle.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
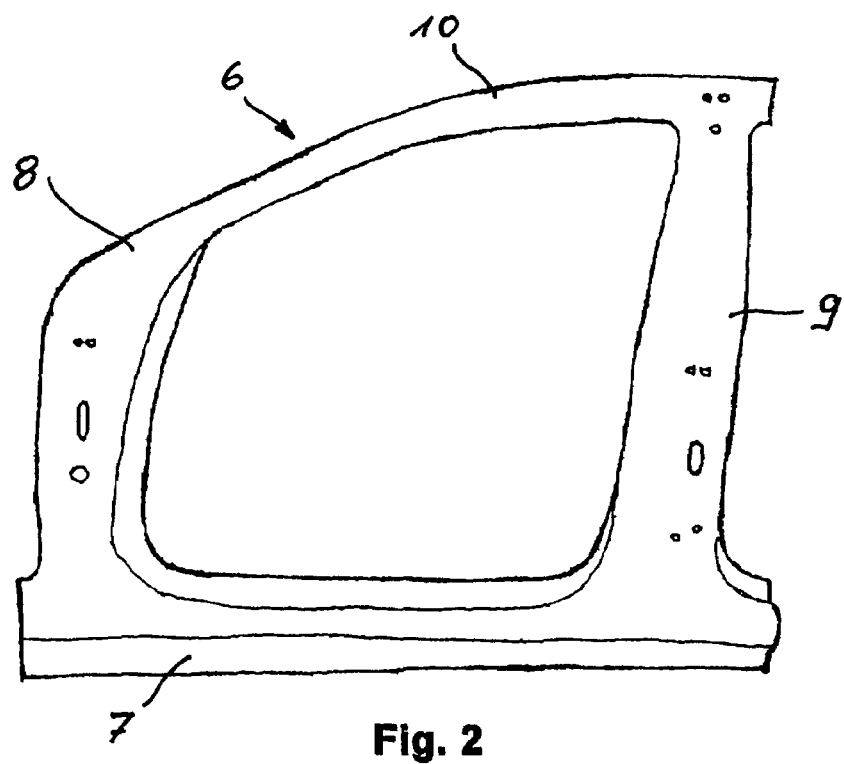
FIG. 2 is a side view of the door frame region of a side panel according to the present invention for use in a motor vehicle.

Turning now to the drawing, and in particular to FIG. 2, there is shown a side view of the door frame region of a structure-reinforced side panel according to the present invention, generally designated by reference numeral 6, for use in a motor vehicle. The side panel 6 has a sill member 7, a roof panel portion 10, as well as A pillar 8 and B pillar 9 which connect the sill member 7 to the roof panel portion 10. The side panel 6 is made of single-piece construction from a sufficiently sized sheet metal blank. In other words, the sill member 7, the A and B pillars 8, 9 and the roof panel portion 10 form a single-piece structure to form the side panel 6 in the absence of any joints, as can be seen by a comparison between FIGS. 1 and 2 which show side panels of same overall outline.

Figure 3:
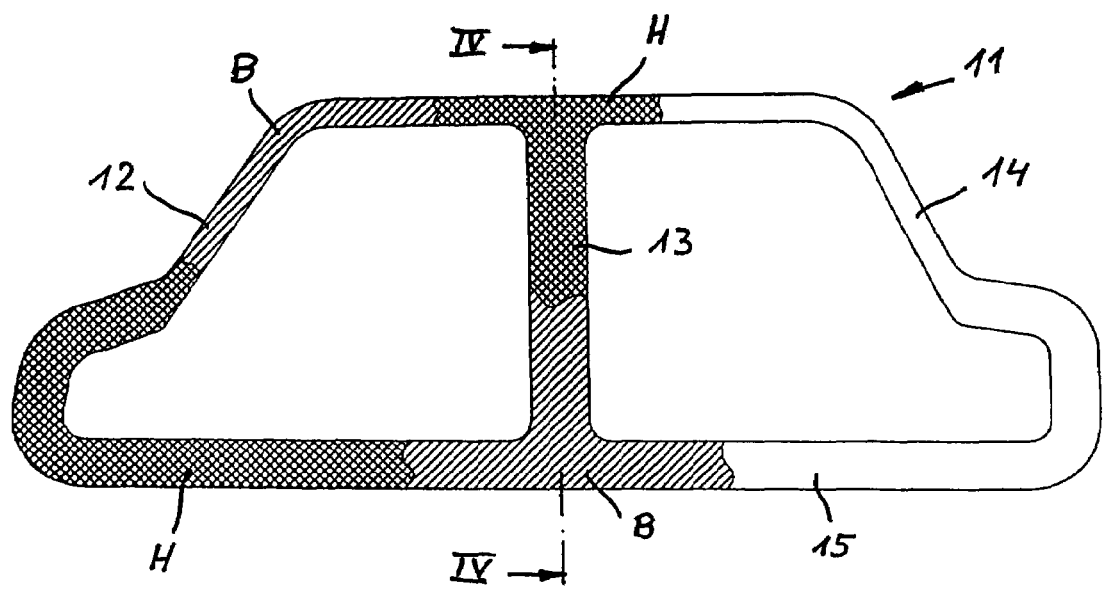
FIG. 3 is a partly sectional view of a variation of a side panel for a motor vehicle with regions of different strength/hardness in accordance with the present invention.

FIG. 3 shows a greatly simplified illustration of a variation of a side panel, generally designated by reference numeral 11 for a motor vehicle. The side panel 11 has a sill member 15, a roof panel portion 16, as well as A pillar 12, B pillar 13, and C pillar 14 which connect the sill member 15 to the roof panel portion 16. The side panel 11 is made in one piece from a single sheet metal blank of a high-strength steel material. FIG. 3 shows areas indicated by cross-hatching and designated by reference character H to differentiate from areas indicated by simple hatching and designated by reference character B. Hereby the areas H in the forward region of the sill member 15 and the upper region of the B pillar 13 have a greater hardness than the areas B in the lower swill member confronting region of the B pillar 13. In other words, the areas H are harder than the areas B. A further soft area B is provided in the upper region of the A pillar 12. Of course, the configuration of the side panel 11 and the distribution of the areas B, H are selected by way of example only. It is, of course, conceivable, to construct the upper region of the A pillar 12 also harder because this region of the A pillar 12 may also be used to integrate a roof reinforcement directly into the side panel 11.

Figure 4:
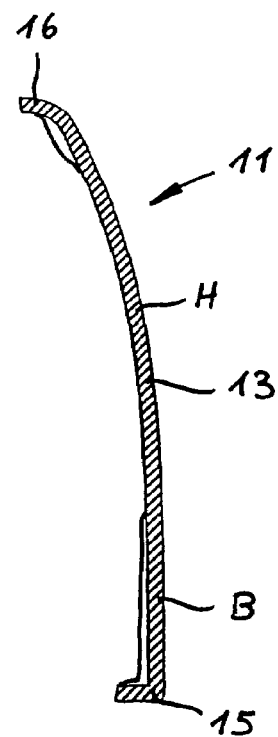
FIG. 4 is a sectional view of the side panel, taken along the line IV-IV of FIG. 3.

A further adjustment of side panel components that are subject to loads may also be realized through use of so-called tailored rolled blanks which are rolled plates that vary in wall thickness. As a result, the deformation behavior of the side panel can be tailored to establish high energy absorption. FIG. 4 shows a possible thickness distribution of the sheet metal blank in the area of the B pillar 13. The lower region of the B pillar 13 in confronting relationship to the sill member 15, while being smaller in hardness is greater in wall thickness. The lower region ends in a central harder region H which terminates in the roof panel portion 16 that is greater in wall thickness but also greater in hardness compared to the lower region of the B pillar 13. The roof reinforcement is integrated directly in the side panel 11. Of course, the regions of varying thickness and hardness can be suited to the motor vehicle at hand.

Figure 5:
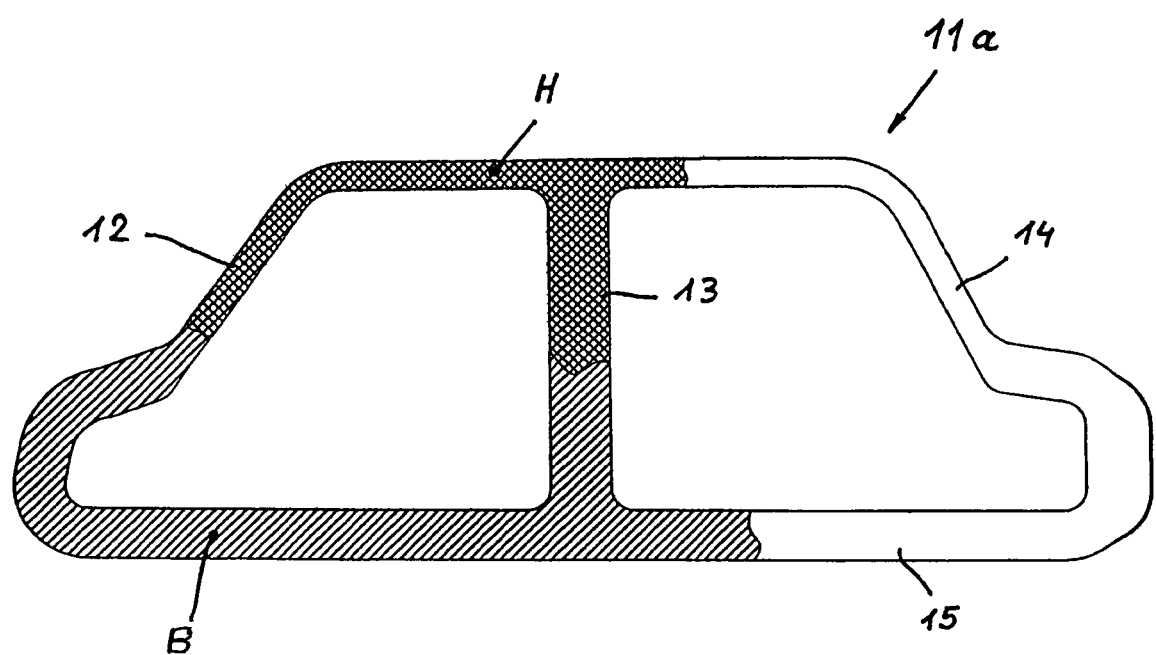
FIG. 5 is a partly sectional view of another variation of a side panel for a motor vehicle with regions of different strength/hardness in accordance with the present invention.

Referring now to FIG. 5, there is shown a partly sectional view of another variation of a side panel, generally designated by reference numeral 11a, for use in a motor vehicle. Parts corresponding with those in FIG. 3 are denoted by identical reference numerals and not explained again. The description below will center on the differences between the embodiments. In this embodiment, provision is made for a different distribution of regions of varying strength and hardness, whereby the upper region of the A pillar 12 as well as the upper region of the B pillar 13 are configured as harder areas H, whereas the entire lower region of the A and B pillars in facing relationship to the sill member 15 is softer (area B). Of course, it is conceivable to make the entire upper region of the side panel 11a, i.e. the A pillar 12, the B pillar 13, and the C pillar 14, harder (area H), while the entire lower region of the A, B, and C pillars near the sill member 15 can be made softer (area B).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A side panel for a motor vehicle, comprising:
   a bottom sill member;
   a roof panel portion; and
   a plurality of pillars extending between the sill member and the roof panel portion,
   wherein the sill member forms with the pillars and the roof panel portion a single-piece structure from a sheet metal blank made of high-strength steel, wherein the single-piece structure has zones of different hardness.

2. The side panel of claim 1, wherein the sheet metal blank has a constant thickness.

3. Side panel side panel for a motor vehicle, comprising:
   a bottom sill member;
   a roof panel portion; and
   a plurality of pillars extending between the sill member and the roof panel portion,
   wherein the sill member forms with the pillars and the roof panel portion a single-piece structure from a sheet metal blank made of high-strength steel and has at least one region which is hardened and subject to increased load in the event of a crash of the motor vehicle, wherein the sheet metal blank has first and second areas, with the first area having a thickness greater than a thickness of the second area, thereby providing the single-piece structure with areas of different thickness.

4. The side panel of claim 3, wherein the first area has a hardness which is smaller than a hardness of the second area.

5. The side panel of claim 1, wherein one of the pillars is a B-pillar, wherein the sill member has a forward zone and the B pillar has an upper zone, said forward zone and said upper zone having a first hardness which is greater than a second hardness of a bottom area of the B pillar in facing relationship to the sill member.

6. The side panel of claim 5, wherein another one of the pillars is an A pillar which has an upper zone of the first hardness.

7. The side panel of claim 1, wherein one of the pillars is an A-pillar and another one of the pillars is a B-pillar, wherein the A pillar has an upper zone and the B pillar has an upper zone, said upper zones of the A and B pillars having a hardness which is greater than a hardness of a bottom area of the A and B pillars in facing relationship to the sill member.

8. The side panel of claim 1, wherein the sheet metal blank is made of a steel alloy containing carbon at an amount between 0.15% by weight to 2.0% by weight.

9. The side panel of claim 1, wherein the sheet metal blank is made of a steel alloy containing, in weight percent, 0.18% to 0.3% of carbon (C), 0.1% to 0.7% of silicon (Si), 1.0% to 2.5% of manganese (Mn), 0.1% to 0.8% of chrome (Cr), 0.1% to 0.5% of molybdenum (Mo), 0.02% to 0.05% of titanium (Ti), 0.002% to 0.05% of boron (B), 0.01% to 0.06% of aluminum (Al), max. 0.01% of sulfur (S), max. 0.025% of phosphor (P), the balance iron (Fe) and incidental melt-based impurities.

10. The side panel of claim 1, wherein the sheet metal blank is provided with an aluminum coating.

11. The side panel of claim 10, wherein the aluminum coating contains about 90% of aluminum and 10% of silicon.

12. The side panel of claim 1, wherein the sheet metal blank has a multi-layer configuration.

13. The side panel of claim 1, wherein the sheet metal blank is hardened in its entirety.

14. The side panel of claim 1, wherein the sheet metal blank is a laser-welded blank.

* * * * *

UNITED STATES PATENT AND TRADEMARK OFFICE
CERTIFICATE OF CORRECTION

PATENT NO.       : 7,396,072 B2
APPLICATION NO.  : 11/258394
DATED            : July 8, 2008
INVENTOR(S)      : Jochem Fischer et al.

Page 1 of 1

It is certified that error appears in the above-identified patent and that said Letters Patent is hereby corrected as shown below:

Column 5, line 18: Delete "Side panel side panel" and insert

--Side panel--.

Signed and Sealed this

Thirtieth Day of September, 2008

JON W. DUDAS
*Director of the United States Patent and Trademark Office*